United States Patent [19]

Petermann

[11] Patent Number: 5,092,423

[45] Date of Patent: Mar. 3, 1992

[54] DOWNHOLE SEISMIC ARRAY SYSTEM

[75] Inventor: Steven G. Petermann, Plano, Tex.

[73] Assignee: Atlantic Richfield Company, Los Angeles, Calif.

[21] Appl. No.: 626,649

[22] Filed: Dec. 12, 1990

[51] Int. Cl.[5] .............................................. G01V 1/40
[52] U.S. Cl. .................................. 181/102; 367/911; 250/268; 324/367
[58] Field of Search ................... 367/25, 911; 181/102; 250/253, 268; 175/50; 324/267; 73/151

[56] References Cited

U.S. PATENT DOCUMENTS

| 4,94,754 | 7/1983 | Watens | 181/102 |
|---|---|---|---|
| 4,507,735 | 3/1985 | Moorehead et al. | 73/151 |
| 4,685,516 | 8/1987 | Smith et al. | 166/65.1 |
| 4,706,744 | 11/1987 | Smith et al. | 367/911 |
| 4,744,438 | 5/1988 | Ruzie et al. | 181/102 |
| 4,844,197 | 7/1989 | Maissa | 367/911 |
| 4,874,060 | 10/1989 | Gueredel et al. | 367/911 |
| 4,953,136 | 8/1990 | Kamate et al. | 367/25 |

Primary Examiner—Nelson Moskowitz
Attorney, Agent, or Firm—Michael E. Martin

[57] ABSTRACT

A seismic array system for receiving seismic signals at spaced-apart points in a wellbore is deployable on coiled tubing from the surface through an isolator apparatus mounted on the wellhead. The array includes spaced-apart geophone sondes which have hydraulic actuators for extension of sonde support pads into engagement with the wellbore wall. Each sonde has a hydraulic control unit for controlling operation of the hydraulic actuator to extend or retract the pads and for preliminary processing of signals received through the geophones of each sonde. Hydraulic fluid and electrical control signals are communicated through the coiled tubing from the surface. A signal processing unit is deployed at the upper end of the array string for final or intermediate processing of the geophoen signals from each sonde.

13 Claims, 4 Drawing Sheets

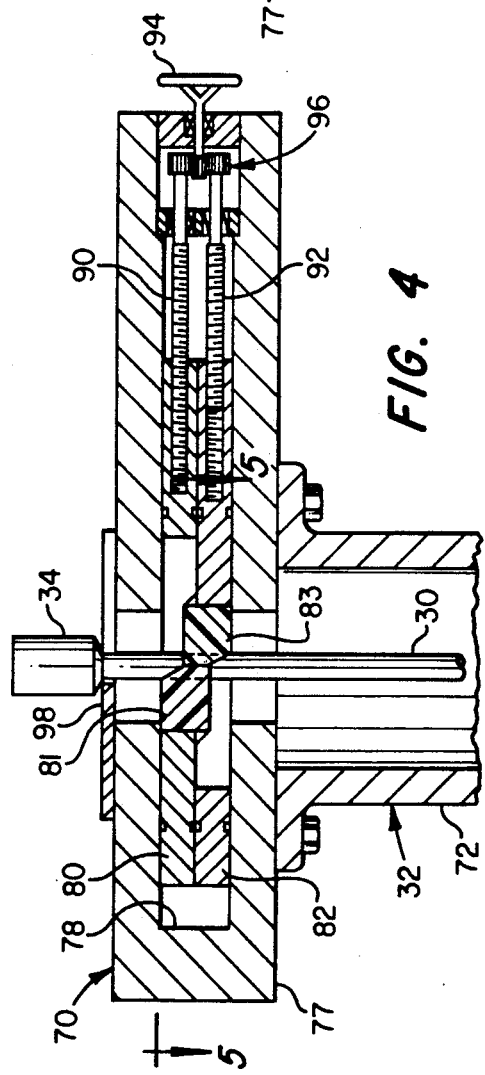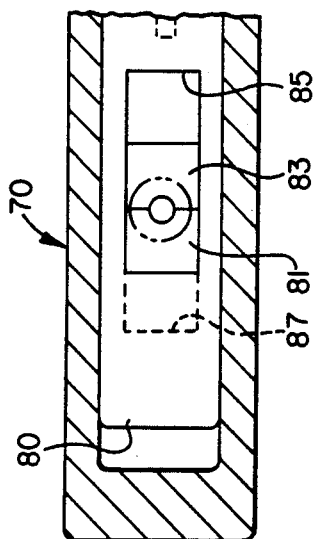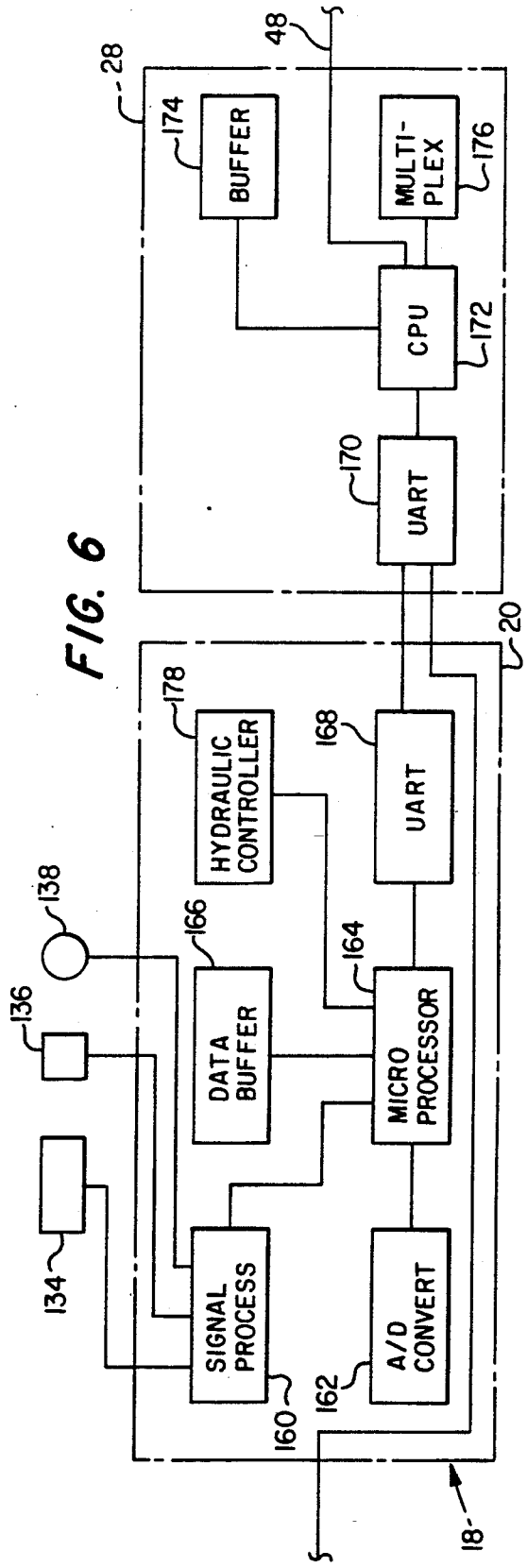

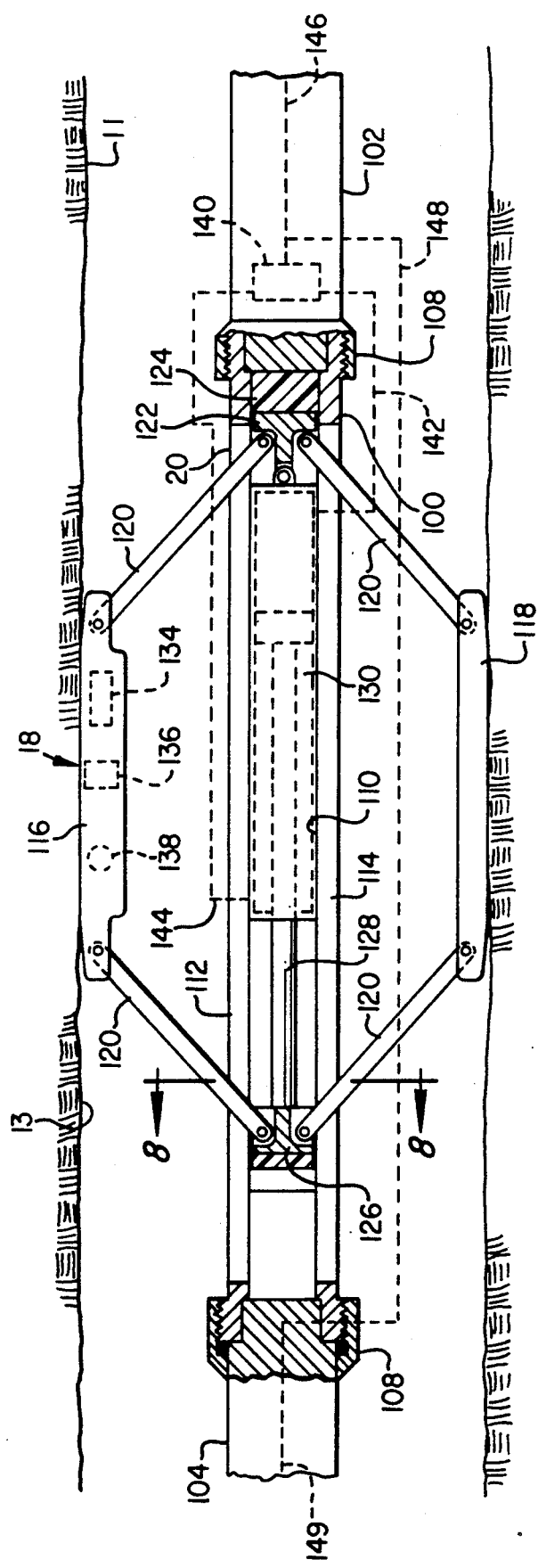
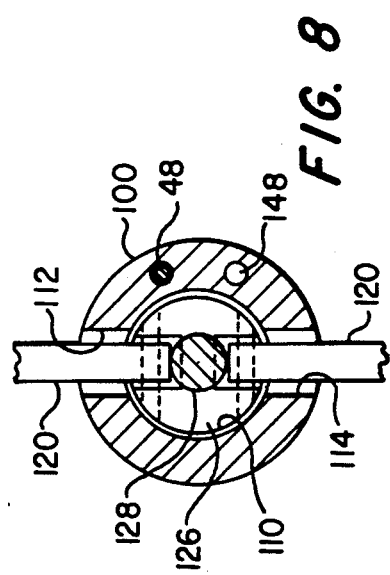
FIG. 7
FIG. 8

DOWNHOLE SEISMIC ARRAY SYSTEM

BACKGROUND OF THE INVENTION

Field of the Invention

The present invention pertains to a downhole seismic event sensing system comprising a series of spaced-apart sondes which are conveyed into a wellbore on a fluid conducting coiled tubing string having electrical signal conducting cable associated therewith.

In recording seismic and other acoustic signals generated in an earth formation, it is sometimes advantageous to provide for signal receiving means disposed in a wellbore penetrating the formation. A long-standing problem prohibiting the development of downhole seismic arrays, particularly for use in oil and gas exploration, has been the limited power that can be converted downhole such as that available to be conducted by electrical cable or wireline. Since a relatively large number of seismic sondes would have to be interconnected and firmly locked against the wellbore wall, it would take considerable power to achieve the locking function at substantially the same time or, conversely, a considerable amount of time would be required to lock each sonde into engagement with the wellbore wall sequentially if a substantial amount of power was not available downhole. Moreover, the limited power transmission capability of conventional multi-conductor electrical cables or wirelines and the time required to lock the sondes sequentially has been heretofore been a disadvantage to the development of downhole seismic arrays.

However, with the continued development of systems and methods for extending coilable metal tubing into a wellbore, which tubing may convey high pressure hydraulic fluid as well as electrical signals through a cable disposed within the tubing, certain systems can be developed which have heretofore been unfeasible. An arrangement for conveying coiled tubing with an electrical conductor disposed therein into a wellbore for operating such devices as logging tools and the like is described in U.S. Pat. No. 4,685,516 to Lonnie J. Smith, et al., and assigned to the assignee of the present invention. A coiled tubing and wireline cable such as arrangement in accordance with the Smith, et al. patent, together with the features of the present invention, provides an improved downhole seismic array system.

SUMMARY OF THE INVENTION

The present invention provides a unique downhole seismic array system for recording acoustic signals being transmitted through an earth formation to a wellbore and useful in seismic activities such as exploration for oil and gas deposits. In accordance with an important aspect of the present invention, a seismic array system is provided wherein one or more in-the-hole sondes may be deployed in a wellbore connected to a tubing string through which hydraulic fluid is conducted for operation of the sondes to engage and disengage from the wellbore wall.

In accordance with another aspect of the present invention, a seismic array system is provided wherein a plurality of vertically or serially spaced sondes are interconnected to each other and to a tubing string for receipt of actuating fluid for deployment of the sondes into forcible engagement with a wellbore wall to receive acoustical signals therefrom and wherein electrical signals may be transmitted to and from the sondes through multiconductor electrical cable means extending within a tubing string and the sondes, respectively.

In accordance with yet a further aspect of the present invention, a seismic array system is provided together with a packer or isolation valve device which is mountable on a wellhead for use in making up and deploying the sonde array as well as retrieving the components of the sonde array.

The present invention still further provides a unique seismic array system which is adapted for use in conjunction with a fluid-conducting and electrical signal-conducting tubing string and conductor assembly and which seismic array may be easily assembled or disassembled with respect to being deployed in and removed from a wellbore using conventional tubing handling equipment and wellbore structures. The use of coilable tubing strings with associated electrical conductor or wireline cable extending therethrough provides for use of a convenient system of seismic sensors which may be deployed in a wellbore using conventional wellhead and tubing deployment equipment.

Improved seismic signal transmission is possible with the unique sonde because of the considerable mechanical advantage realized through the use of hydraulic fluid to deploy acoustic signal sensors or "geophones" into engagement with the wellbore wall. Still further, the present invention may be utilized in conjunction with wellbores extending at an incline to the vertical or, even, substantially horizontally.

Those skilled in the art will recognize the abovedescribed advantages and superior features of the present invention, together with other unique aspects thereof upon reading the detailed description which follows in conjunction with the drawing.

BRIEF DESCRIPTION OF THE DRAWING

FIG. 4 is a detailed section view of one of the sonde array isolation valves for the packer or isolation apparatus of the present invention;

FIG. 5 is a view taken substantially from the line 5—5 of FIG. 4;

: FIG. 6 is a schematic diagram showing the signal processing components disposed in the respective sondes of the seismic array system;

FIG. 7 is a section view of one of the sondes showing the actuator mechanism deployed for operation of the geophones; and FIG. 8 is a detailed section view taken along the line 8—8 of FIG. 7.

DESCRIPTION OF A PREFERRED EMBODIMENT

Figure 1A:
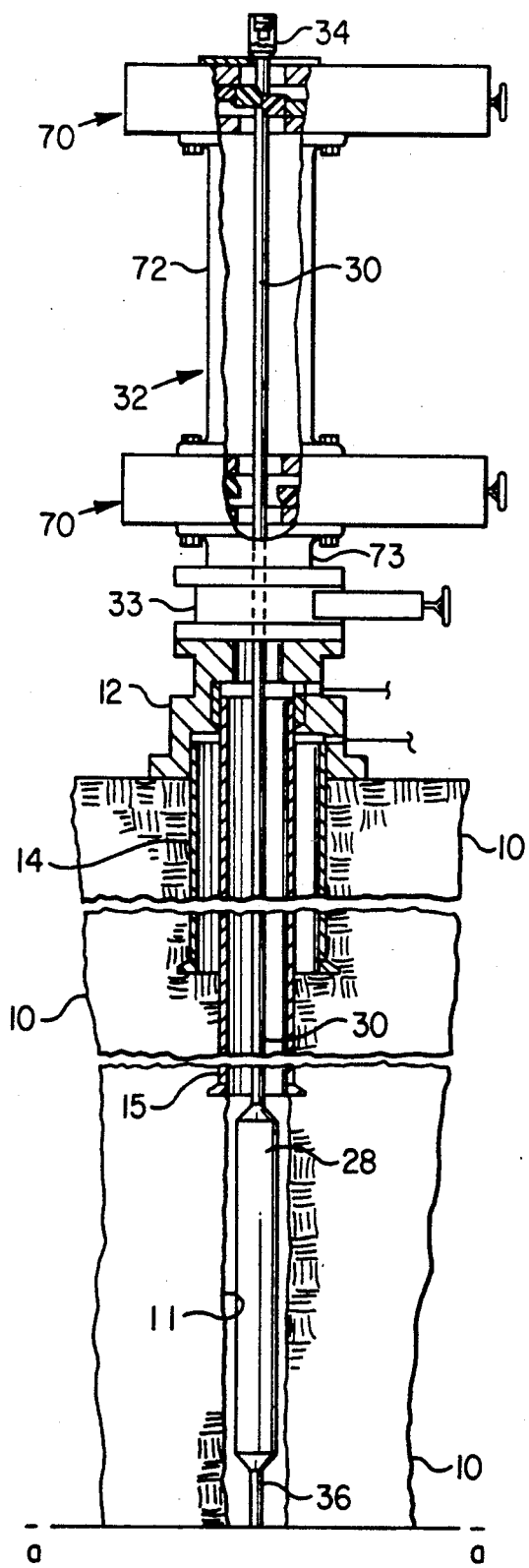
FIGS. 1A and 1B comprise a view in somewhat schematic and at least partially sectioned form of a unique seismic array system in accordance with the present invention.

In the description which follows, like parts are marked throughout the specification and drawing with the same reference numerals, respectively. The drawing figures are not necessarily to scale, and certain features of the invention may be shown in schematic form in the interest of clarity and conciseness.

Figure 1B:
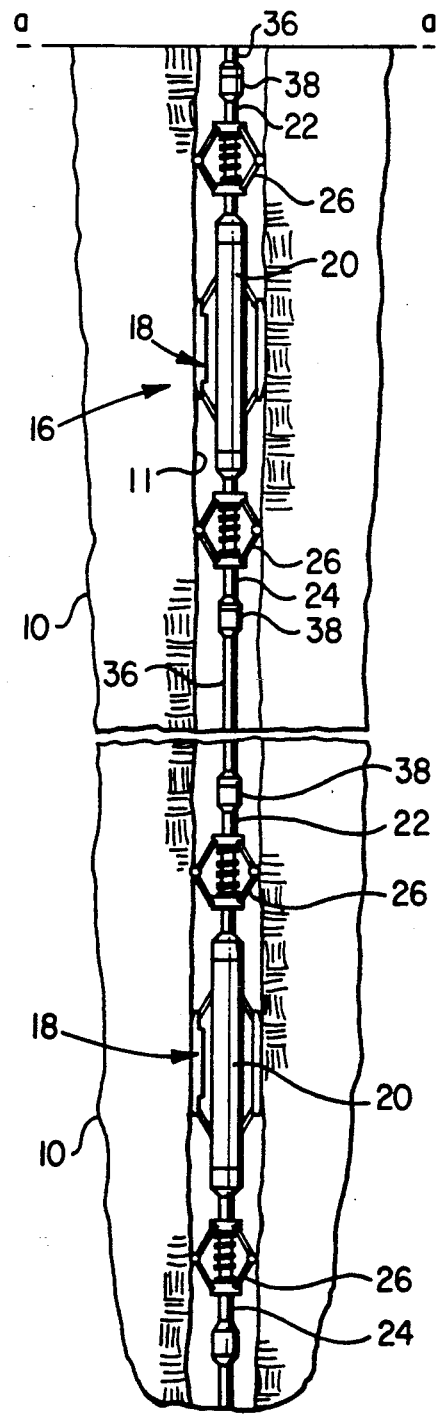

Referring to FIG. 1A, there is illustrated a portion of an earth formation 10 into which a wellbore 11 has penetrated. The wellbore 11 is of conventional construction and may include a wellhead 12 from which one or more casing strings 14 and 15 extend at least partially into the wellbore 11. The uncased portion of the wellbore 11 is shown in FIG. 1B with a unique seismic sonde array disposed therein and generally designated by the numeral 16. The seismic array 16 includes a plurality of serially space-apart sondes 18, which will be described in further detail herein and which are suitably interconnected as will also be further described. Each of the sondes 18 includes a generally cylindrical housing 20, connected at its opposite ends to tubular portions 22 and 24, each of which are provided with suitable centralizers 26. The centralizers 26 may be of a conventional type but are advantageously of a type described in my U.S. Pat. No. 4,830,105, assigned to the assignee of the present invention. Although only two sondes 18 are illustrated in FIG. 1, those skilled in the art will recognize that any number of sondes, limited only by practical considerations, may be connected end-to-end and suitably spaced apart by intermediate sections of tubing, as desired, in order to make up an array which extends over a length of wellbore 11 desired for detecting seismic events.

The sonde array 16 further, preferably, includes a housing 28 interposed in the array between the wellhead 12 and the serially-connected sondes 18 and also connected to a section of tubing string 30 extensible through the wellhead 12 and into an isolator apparatus, generally designated by the numeral 32. The apparatus 32 is adapted to mount on the wellhead 12 and have interposed therebetween a conventional safety valve or blowout preventer 33, if deemed necessary. In the condition illustrated in FIG. 1, the apparatus 32 is supporting the upper end 34 of tubing section 30 and the entire sonde array system 16 preparatory to retrieval or further deployment of the system without exposing the wellbore 11 to surface pressure conditions.

Figure 2:
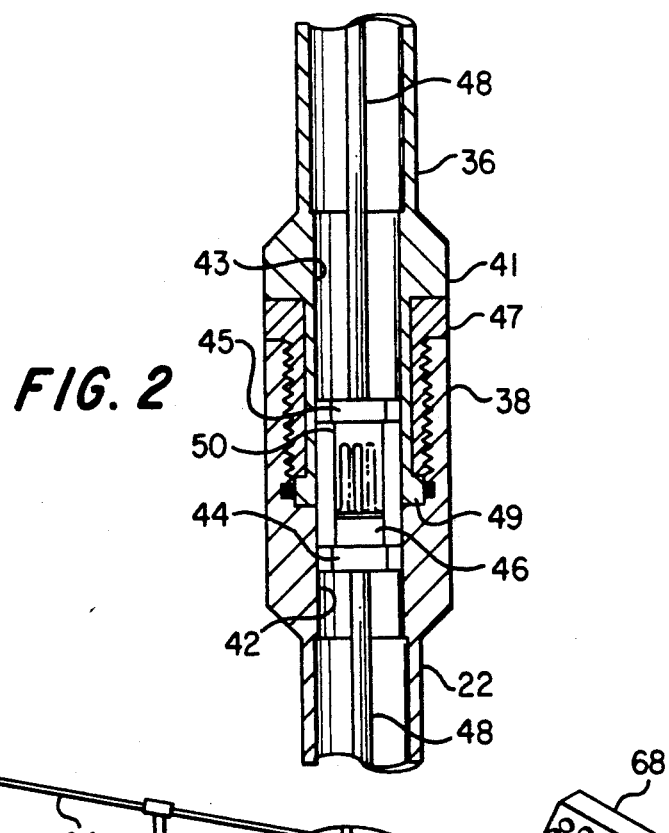
FIG. 2 is a detailed view showing a typical coupling between sonde and tubing members.

The sondes 18, the housing 28 and the tubing section 30 are interconnected to each other and to further tubing sections, such as a tubing section 36, between the sondes 18 illustrated in FIG. 1, by respective couplings generally as illustrated in FIG. 2.

FIG. 2, by way of example, illustrates a coupling 38 between the lower sonde 18 and the tubing section 36. For example, the tubing section 22 forming part of the sonde 18 has an upper, internally threaded coupling portion 40 which is formed with a central passage 42 in which is disposed a support member 44 adapted to support a multi-pin type electrical connector 46 which is connected to a section of elongated multi-conductor electrical cable 48 extending within the tubing section 22. The connector member 46 is suitably connected, in the coupled position of the coupling 38 illustrated, to a socket-type connector member 50 which is supported in a coupling member 41 suitably forming part of the tubing section 36, for example. The connector member 50 is supported in a bore 43 of the coupling member 41 by a support member 45 and is connected to another section of multi-conductor cable 48 as illustrated. The coupling member 41 is provided with a rotatable sleeve-type nut 47 for threadedly connecting the coupling member 41 to the coupling member 40 without rotating these two members relative to each other. The nut 47 is retained on the coupling member 41 by a transverse shoulder 49 formed at the distal end of the coupling member 41.

Accordingly, with the type of coupling illustrated in FIG. 2, the tubing sections 30 and 36, the housing 28 and the sondes 18 may be coupled together in the arrangement illustrated in FIG. 1 while providing for extension of a multi-conductor electrical cable through the tubing portions of these elements and while also providing for the conduction of pressure fluid through the tubing elements of these members. In this regard, the support members 44 and 45, FIG. 2, are provided with suitable passages so that fluid may flow down through the tubing section 36, the bore 43, the passage 42 and the tubing section 22, for example. Those skilled in the art will recognize that other coupling arrangements may be provided for interconnecting members which have a multi-conductor electrical cable and a fluid-conducting passage for extension between two coupled members. However, for the purposes of this description, the type of coupling 38 illustrated is used where indicated in FIG. 1.

Figure 3:
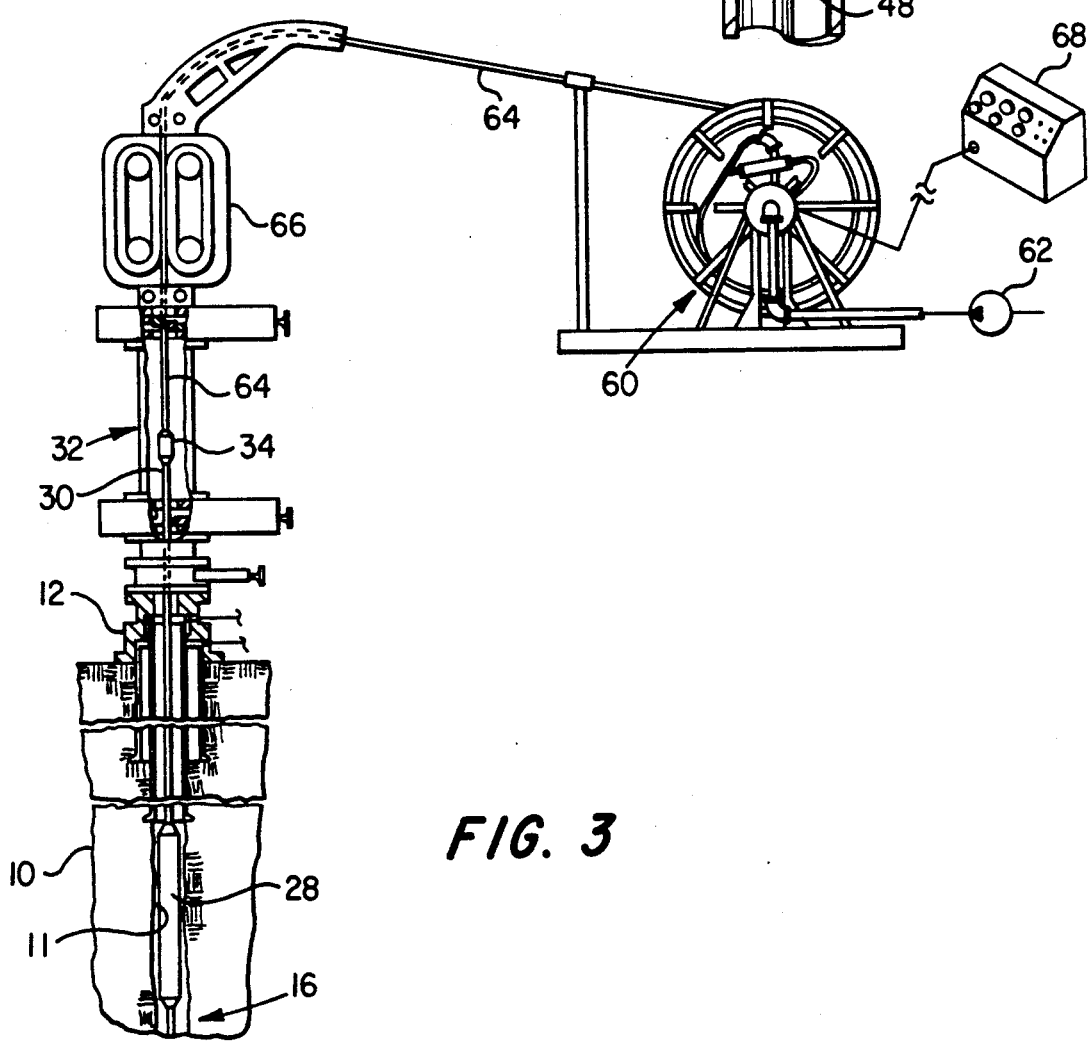
FIG. 3 is a view in somewhat schematic form showing the seismic array system connected to a coiled tubing/wireline unit.

FIG. 3 shows the sonde array 16 connected to a source of pressure fluid and a controller for the multi-conductor electrical cable 48 characterized by a coiled tubing storage reel 60 of a type described in U.S. Pat. No. 4,685,516 to Smith, et al., and assigned to the assignee of the present invention. Pressure fluid is supplied by a pump 62 to a continuous length of coilable tube 64 which may be deployed from the reel 60 through a tubing injection apparatus 66 mounted or disposed above on the isolator apparatus 32. The tubing injection apparatus 66 may be of a conventional type, commercially available, such as from Hydra Rig Corporation, Fort Worth, Texas. In the condition of the seismic array system 16 illustrated in FIG. 3, the coilable tubing 64 has been coupled to the tubing section 30, as shown, with its upper end 34 disposed within the isolator apparatus 32.

The tubing injection apparatus 66 may be suitably mounted on top of the isolator apparatus 32 or in proximity thereto for inserting and withdrawing the seismic array 16 with respect to the wellbore 11. Electrical signals may be transmitted to and received from the cable 48 by a controller unit 68 connected to the cable 48, generally in the manner described in further detail in U.S. Pat. No. 4,685,516. In the arrangement illustrated in FIG. 3, pressure fluid may be conducted down to and through the seismic array 16 for purposes to be described herein, while certain electrical signals may be transmitted to and received from the array with respect to the controller 68, as will be clear to those skilled in the art upon reading further the description of various components of the system.

Referring again to FIG. 1, the isolator apparatus 32 includes upper and lower isolator valve assemblies 70 which are interconnected by a generally cylindrical housing 72. The lower isolator valve assembly 70 is connected to the safety valve 33 by an intermediate flanged connector part 73, FIG. 1.

Referring now to FIGS. 4 and 5, the upper valve assembly 70 is shown in further detail. The valve assemblies 70 each include a housing 77 forming an internal cavity 78 in which opposed upper and lower closure plates 80 and 82 are disposed. The closure plates 80 and 82 are adapted to slide in opposite directions toward and away from each other to form a closure around the tubing 30, as illustrated in FIG. 4, and to move far enough apart to permit movement of the sondes 18 through the isolator apparatus into and out of the wellbore 11. The closure plates 80 and 82 support opposed elastomeric closure seal members 81 and 83, respectively, which are adapted to move into abutting relationship, as illustrated in FIG. 5, to close over the outer diameter of the tube 30. The closure plates 80 and 82 also include elongated slots 85 and 87 formed therein to provide a large enough opening when the plates are moved away from each other to permit movement of the maximum diameter portions of the sondes 18 through the isolator apparatus.

As shown in FIG. 4, the closure plates 80 and 82 may be moved by a suitable mechanism, including rotatable actuator screws 90 and 92 which are threaded into suitable internally threaded receptacles in the ends of the closure plates. The screws 90 and 92 are suitable supported for rotation within the housing 77 and may be rotated by a hand wheel or other suitable actuating mechanism 94 driving the screws through a suitable gear train 96. In the arrangement shown, the screws 90 and 92 would have threads of the opposite hand in order to effect movement of the closure plates in opposite directions with respect to each other. In the arrangement shown in FIG. 4, the upper end of the tubing string 30 is temporarily held in position on the isolator apparatus 32 by a removable retainer plate 98 engaged with the coupling end 34.

Referring now to FIG. 7, each of the sondes 18 is preferably configured in such a way that the housing 20 is made up of separable housing members 100, 102 and 104 which are suitably coupled together to provide for the passage of hydraulic fluid through to the tubing portions in between sondes and for the passage of electrical conductor wires through each sonde. The housing member 100 may be coupled to the housing member 102, and the housing member 104, respectively, by rotatable coupling nuts 108, for example. The housing member 100 also includes a central cylindrical passage 110 and opposed slots 112 and 114 formed therein. Opposed retractable and extensible pad members 116 and 118 are pivotally connected to arms 120, as illustrated. One set of arms 120 is connected to a retainer member 122 disposed in the passage 110 and supported by a resilient damper or isolator member 124 to minimize the transmission of vibrations from the sonde housing 20 to the pads 116 and 118.

The other set of arms 120 is pivotally connected to a retainer member 126 slidably disposed in the passage 110 and connected to a piston rod 128 of a hydraulic cylinder and piston actuator 130; see FIG. 8, also. The actuator 130 is adapted to extend the pads 116 and 118 into forcible engagement with the wellbore wall 13, as illustrated, or to retract the pads away from the wall and into a configuration which will minimize the overall diameter of the sonde 18 to facilitate passage through the isolator apparatus 32 and the wellbore 11. At least the pad 116 is adapted to support a geophone array, including triaxially arranged geophones 134, 136 and 138. The geophones 134, 136 and 138 are adapted to sense acoustic signals in an axial, radial and tangential direction with respect to the longitudinal central axis of the wellbore 11 and are suitably electrically connected to signal processing equipment disposed in the housing 20. The actuator 130 is controlled to extend or retract the pads 116 or 118 by suitable control valve means 140 disposed in the housing member 102, for example, and connected by way of conduit means 142 and 144, shown schematically, to the actuator 130. Passage means 146 formed in the housing member 102 is adapted to communicate hydraulic fluid to the valve means 140, and by way of a bypass passage 148 in the housing members 100 and 104, hydraulic fluid may be conducted to the successive sondes 18 connected in the string or array 16 illustrated in FIG. 1. Conductor wires required for controlling the valve means 140 in each sonde 18 and for transmitting signals from the geophone array of each sonde may also be disposed in the passage 146, 148 or other suitable conduit means formed in the sonde.

Referring briefly to FIG. 6, there is illustrated in schematic form the general arrangement of the signal transmitting and processing system which is contemplated in accordance with the present invention for inclusion in respective ones of the sondes 18 and the signal processing unit 28. Each of the sondes 18, having an array of geophones 134, 136 and 138, preferably includes a signal processing unit 160 interconnected to an analog to digital (A/D) converter unit 162 and to a microprocessor 164. A data buffer or storage unit 166 and a UART 168 is also connected to the microprocessor 164 for handling the signals processed by the microprocessor for transmission through a second UART 170 to a central processing unit 172 located in the housing 28. A suitable memory or data buffer 174 and multiplexing unit 176 are also disposed in the housing 28 for processing compressed and averaged data to be sent uphole through the cable 48 to suitable signal receiving means associated with the controller 68.

With the arrangement illustrated schematically in FIG. 6, relatively inexpensive primary signal processing may be carried out at each of the sondes 18 with respect to the signals received by the geophones 134, 136 and 138 and the primary processed signals then transmitted to the apparatus 28 for further processing before transmitting resultant signals by way of the cable 48 to the surface. Each sonde 18 is also provided with a suitable controller 178 for controlling operation of the valve means 140 to extend and retract the pads 116 and 118.

Referring again to FIG. 1, operation to deploy and retrieve the array 16 is believed to be understandable to those of ordinary skill in the art from the foregoing description. However, briefly, in deploying the sonde array 16 in a wellbore 11, the sondes 18 may be lowered on suitable tubing sections 36 and 30, spaced apart by predetermined lengths thereof into the wellbore 11 through the isolator apparatus 32. With the safety valve 33 closed and the lower valve assembly 70 open, the first sonde 18 is lowered into the interior of the isolator apparatus 32 and the upper valve 70 closed around the tubing to which the sonde is connected. The valve 33 is then opened, and the sonde is inserted into the wellbore 11 while the seal formed by the closure pads 81 and 83 of the upper valve 70 prevents fluid leakage from the isolator apparatus 32.

Once a sonde 18 has passed the lower valve 70, the valve may be closed around the tubing 30, for example, while the upper valve 70 is opened to permit entry of the next sonde 18 into housing 72 and, of course, connected to the upper end of a tubing section 30 or 36. Pressure in the housing 72 may be bled down through a suitable drain valve, not shown, prior to opening the upper valve 70. In this way, the sonde array 16 may be deployed into wellbore 11, with the final member of the array being the signal processing apparatus 28 being connected into the string and lowered through the isolator apparatus 32 and the wellhead 12 in essentially the same manner as described above for one of the sondes 18. The upper tube end coupling 34 is then connected to the coiled tubing string 64 and lowered through the isolator apparatus 32 by alternately opening and closing the upper and lower valve assemblies 70 to permit clearing the coupling 34. The tubing 64, being of a continuous length, will normally permit movement of the sonde array 16 to a selected position in the wellbore 11 without further closing or opening of the valves of the isolator apparatus 32. When the array 16 is disposed in the desired position in the wellbore 11, the respective sondes 16 are actuated by remote control to have their hydraulic actuators 130 extend the pads 116 and 118 into forcible engagement with the wellbore wall for receiving seismic signals from the earth formation 10 at selected spaced-apart points in the wellbore. During deployment, of course, the signals received by the geophone arrays of each sonde 18 are processed and transmitted to the signal processing and transmitting apparatus 28 for further transmission to the surface or for storage and retrieval upon retrieval of the array 16 from the wellbore. Retrieval of the seismic array 16 is carried out in substantially the reverse order of that described above for deployment and is believed to be within the purview of the art worker from the foregoing description.

Although a preferred embodiment of the present invention has been described in detail herein, those skilled in the art will recognize that various substitutions and modifications may be made to the various elements without departing from the scope and spirit of the invention, as recited in the appended claims.

What is claimed is:

1. An apparatus for receiving seismic signals from an earth formation at least at one or more points in a wellbore penetrating said formation, said apparatus comprising:
   a sonde including extensible and retractable support means thereon for supporting seismic signal receiver means, hydraulic actuator means for extending and retracting said support means, body means for supporting said actuator means and said support means and signal transmitting means for transmitting electrical signals related to seismic signals received by said receiver means;
   tubing means connected to said sonde for deploying said sonde in said wellbore, said tubing means including electrical conductor means disposed therein for conducting electrical signals between means on the surface of said formation and said sonde and said tubing means comprising means for conducting hydraulic fluid to said sonde for operation of said actuator means; and
   means for supplying hydraulic fluid from the surface of said formation through said tubing means to said sonde for operating said actuator means.

2. The apparatus set forth in claim 1 including:
   means for controlling the operation of said actuator means to extend and retract said support means at will.

3. The apparatus set forth in claim 1 including:
   a plurality of spaced-apart sondes interconnected by tubing means, each of said sondes including support means for supporting seismic signal receiver means and hydraulic actuator means for extending and retracting said support means into forcible engagement with said formation at said wellbore wall.

4. The apparatus set forth in claim 1 including:
   an isolator apparatus mounted at the surface of said formation at an entrance of said wellbore, said isolator apparatus including housing means and spaced-apart closure means for receiving said sonde for extension into and retraction from said wellbore while isolating wellbore fluids from exit through said wellbore entrance.

5. The apparatus set forth in claim 4 wherein: said closure means comprise valve means having opposed sliding closure plates, said closure plates each including a resilient closure member formed thereon and adapted to engage the closure member of the other plate for forming a substantially fluid-tight closure around said tubing means.

6. The apparatus set forth in claim 1 wherein:
   said body means includes a housing, and said hydraulic actuator means includes a linearly extensible piston and cylinder type actuator disposed in said housing for extending and retracting said support means with respect to a wall of said wellbore for forcibly engaging said wall.

7. The apparatus set forth in claim 6 wherein:
   said support means includes opposed support pads, each of said pads being supported by arm means pivotally connected to said support pads and said actuator, and at least one of said support pads includes seismic signal receiver means disposed thereon for receiving seismic signals from said formation when said support pads are engaged with said wellbore wall.

8. The apparatus set forth in claim 7 wherein:
   said housing includes means for extending electrical conductor means through said housing and means for conducting hydraulic fluid through said housing.

9. The apparatus set forth in claim 1 wherein:
   said sonde includes signal processing means for processing signals received by said signal receiver means, said signal processing means including means for converting signals received by said signal receiver means to digital form, microprocessor means for conditioning said digital form signals, and signal transmission means for conducting signals from said microprocessor to further signal processing means associated with said apparatus.

10. The apparatus set forth in claim 9 including:
    means for multiplexing said signals received from said sonde and for transmitting said multiplexed signals along cable means through said apparatus to the surface of said formation.

11. In an apparatus for receiving seismic signals from an earth formation at a predetermined point in a wellbore penetrating said formation, elongated coilable tubing means extending within said wellbore including electrical conductor means extending within said tubing means for conducting electrical signals, a sonde comprising:
    body means;
    extensible and retractable support means disposed on said body means for supporting seismic signal receiver means;
    seismic signal receiver means disposed on said support means for receiving seismic signals from said earth formation;
    hydraulic actuator means for extending and retracting said support means with respect to said body means, said hydraulic actuator means being disposed on said body means; and coupling means for coupling said sonde to said tubing means for conveying hydraulic fluid through said tubing means to said sonde for operation of said actuator means and for transmitting electrical signal means between said sonde and at least one of signal transmitting means and signal receiving means disposed remote from said sonde.

12. The apparatus set forth in claim 11 wherein:
said body means includes a housing, and said hydraulic actuator means includes a linearly extensible piston and cylinder type actuator disposed in said housing for extending and retracting said support means with respect to a wall of said wellbore for forcibly engaging said wall.

13. The apparatus set forth in claim 12 wherein:
said support means includes opposed support pads, each of said pads being supported by arm means pivotally connected to said support pads and said actuator, and at least one of said support pads includes seismic signal receiver means disposed thereon for receiving seismic signals from said formation when said support pads are engaged with said wellbore wall.

* * * * *